(12) United States Patent
Cingolani

(10) Patent No.: US 9,560,931 B2
(45) Date of Patent: Feb. 7, 2017

(54) STEAM WAND FOR COFFEE MACHINE

(71) Applicant: Claudio Enrico Cingolani, Camerino (IT)

(72) Inventor: Claudio Enrico Cingolani, Camerino (IT)

(73) Assignee: NUOVA SIMONELLI S.P.A., Belforte del Chienti (MC) (IT)

( * ) Notice: Subject to any disclaimer, the term of this patent is extended or adjusted under 35 U.S.C. 154(b) by 345 days.

(21) Appl. No.: 14/248,600

(22) Filed: Apr. 9, 2014

(65) Prior Publication Data

US 2014/0299003 A1   Oct. 9, 2014

(30) Foreign Application Priority Data

Apr. 9, 2013 (IT) ............................... MC2013006 U

(51) Int. Cl.
*A47J 31/44* (2006.01)
*A47J 43/12* (2006.01)

(52) U.S. Cl.
CPC ........... *A47J 31/4489* (2013.01); *Y10S 261/16* (2013.01); *Y10S 261/76* (2013.01)

(58) Field of Classification Search
CPC .... A47J 31/4489; Y10S 261/16; Y10S 261/76
USPC ............ 99/287, 323.1, 293; 366/101, 137.1; 261/DIG. 16, DIG. 76
See application file for complete search history.

(56) References Cited

U.S. PATENT DOCUMENTS

| | | | | |
|---|---|---|---|---|
| 5,233,915 A | * | 8/1993 | Siccardi | A47J 31/4489 239/520 |
| 5,785,256 A | * | 7/1998 | Mahlich | A47J 31/4489 239/552 |
| 6,443,374 B1 | * | 9/2002 | Astachow | F02M 61/184 239/533.2 |
| 8,960,080 B2 | * | 2/2015 | Saito | A47J 31/4489 261/DIG. 16 |

\* cited by examiner

*Primary Examiner* — Reginald L Alexander
(74) *Attorney, Agent, or Firm* — Egbert Law Offices, PLLC

(57) ABSTRACT

A steam wand for coffee machines is provided with a steam dispensing head that is centrally provided with a blind axial conduit that feeds one or more dispensing nozzles that end on the outside of the head and are provided with a tangential sloping direction with respect to the cylindrical conduit.

3 Claims, 6 Drawing Sheets

STEAM WAND FOR COFFEE MACHINE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application relates to a steam wand for professional coffee machines as well as home coffee machines.

The peculiarities and advantages of the present invention will become evident after a short description of the prior art.

2. Description of Related Art Including Information Disclosed Under 37 CFR 1.97 and 37 CFR 1.98.

It is known that all coffee machines, and particularly professional machines used in bars, are provided with at least one "steam wand". Such a term usually indicates a small rigid metal tube that delivers pressurized steam produced by a boiler mounted inside the coffee machine.

As it is known, the forced hot steam jet delivered by such a steam wand is used to instantaneously heat milk or other liquids used to prepare drinks. The main use of the steam wand of any coffee machine is the preparation of cappuccinos, when it is necessary to forth milk in order to obtain a fluffy foam.

However, it must be noted that, in spite of their huge popularity, traditional steam wands are not perfectly satisfactory from the functional viewpoint, given the fact that milk can be correctly frothed only if the operator follows a specific, empiric procedure as illustrated below.

It must be noted that such a procedure largely depends on the operator's experience and skill because traditional steam wands are not able to guarantee excellent milk frothing on a regular basis regardless of the operator.

For a better understanding of the problem, it must be noted that a traditional steam wand usually ends with an enlarged head, whereon one or more steam dispensing nozzles are obtained.

In particular, said nozzles are turned downwards with the same inclination and have a radial direction with respect 5 to the axis of the steam wand, i.e. the axes of the dispensing nozzles intersect the axis of the axial conduit obtained inside the steam wand that is actually used to feed the nozzles.

However, similar nozzles divide the hot steam flow that flows at high pressure inside the steam wand into one or more jets, substantially with the same size.

In case of a similar configuration of a typical steam wand, the operator must follow the procedure illustrated below to froth the milk contained in a metal jug.

The operator must insert the head of the steam wand in the jug, making sure it is immersed deeply into the milk, and then dispense forced hot steam through the steam wand. So the foam will progressively increase the level of milk in the jug; for this reason the operator must lower the jug slowly, while making sure that the head of the steam wand remains always immersed.

This first step of the milk frothing procedure is completed when the milk temperature reaches 35-37° C. It must be noted that the achievement of such a temperature is instantaneously detected by the operator, without using a thermometer, as soon as the operator feels that the temperature of the jug that contains the milk to be frothed tends to exceed the temperature of the hand that holds the handle of the milk jug.

Once this first operation has been completed, the milk foam must be compacted in order to achieve a fine texture and a glossy surface. To do that, while still keeping the head of the steam wand immersed in the milk and dispensing steam, the operator must slightly tilt the jug in order to create a fast whirl in the milk mass that will compact the foam.

The operator must stop dispensing steam as soon as the milk has reached a temperature of 65-67° C. Also in this case, an expert operator can understand that such a temperature has been reached, without using a thermometer, as soon as he feels that the jug is becoming too hot to be held with bare hands.

The best result of such a milk frothing operation is not always guaranteed, it being dependent on the operator's experience and skill.

BRIEF SUMMARY OF THE INVENTION

The specific purpose of the present invention is to devise a steam wand for coffee machines that guarantees the best result of the milk frothing operation with absolute certainty and regularity in view of its innovative configuration and regardless of the operator's experience and skill.

The idea at the base of the present invention is to give a special configuration to the head of the steam wand of the invention, based on the presence of one or more dispensing nozzles and on the special inclination given to said nozzles and consequently to the hot steam jets.

In fact, the specific dispensing direction of said nozzles guarantees the formation of a whirl inside the milk mass that is especially effective in frothing milk for cappuccinos, without forcing the operator to traditionally change the position of the milk jug as illustrated above.

BRIEF DESCRIPTION OF THE SEVERAL VIEWS OF THE DRAWINGS

For explanatory reasons the description of the invention continues with reference to the attached drawing, which only has an illustrative, not limiting value, wherein.

DETAILED DESCRIPTION OF THE INVENTION

Figure 1:
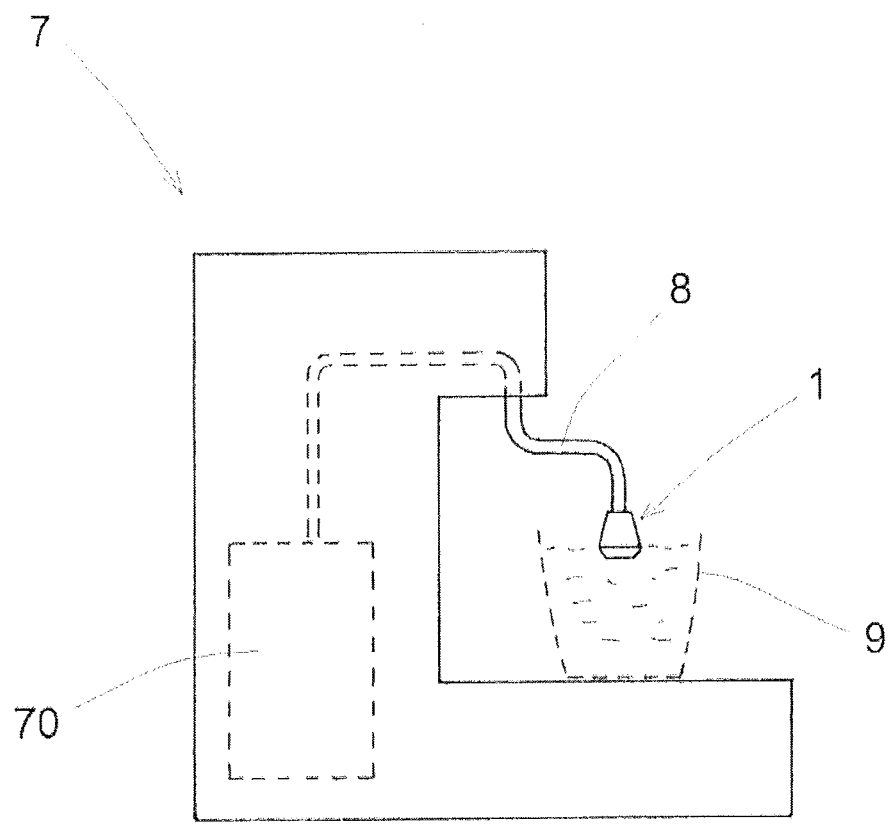
FIG. 1 is a diagrammatic lateral view of a coffee machine having a steam wand of the invention, wherein a jug is evidenced in hatch line.

With reference to FIG. 1, a coffee machine (7) comprises a steam wand (8) having a traditional configuration, i.e. the steam wand (8) consists in the traditional small metal tube, preferably an articulated tube.

Said steam wand (8) is fed with pressurized steam by a boiler (70) provided in a coffee machine.

Figure 2:
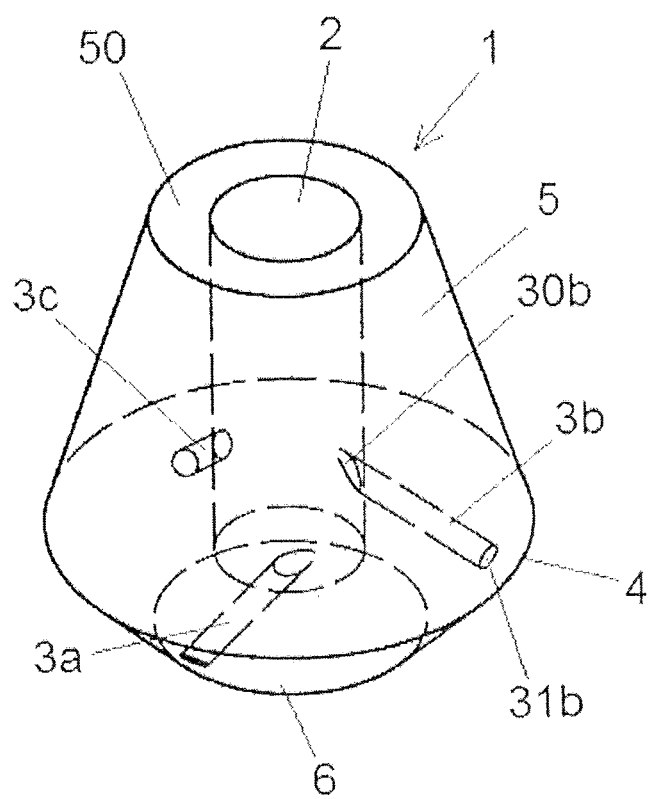
FIG. 2 is an axonometric view of the dispensing head of the steam wand of FIG. 2.
Figure 3:
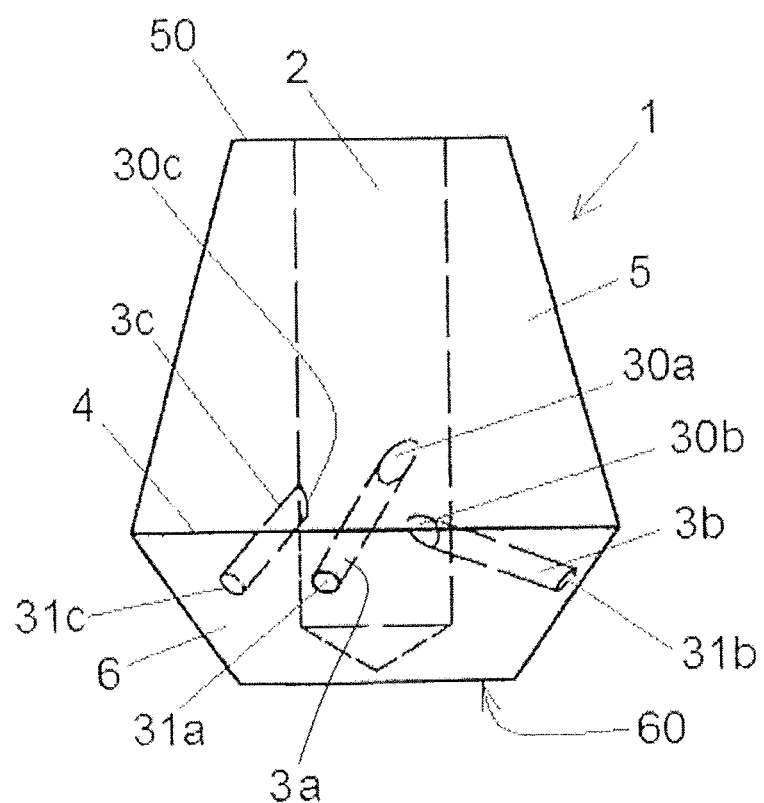
FIG. 3 and FIG. 4 are respectively a side view and a top view of the dispensing head of FIG. 2.

The steam (8) wand comprises a dispensing head (1), best showed in FIGS. 2-3.

The peculiarity of the steam wand according to the invention consists in a special configuration of the dispensing head (1).

The dispensing head (1) has a tapered shape, and comprises a first section (5) with truncated-conical profile joined with a second section (6) with overturned truncated-conical profile. The second section (6) has lower height with respect the first section (5).

The first and second sections (5, 6) have the same greater base, consisting in peripheral portion (4) of the dispensing head having greater diameter. The first section (5) has a minor base consisting in a top (50) of the dispensing head. The second section (6) has a minor base consisting in a bottom (60) of the dispensing head. The top (50) and the bottom (60) of the dispensing head have same diameter.

An axial conduit (2) is provided, in a axial direction of the dispensing head (1). The axial conduit (2) is open on the top (50) of the dispensing head. The axial conduit (2) is blind on the bottom (60) of the dispensing head.

The steam wand (8) has a free end suitable to be inserted into the axial conduit (2) of the dispensing head from the top (50) of the dispensing head.

Three channels (3a, 3b, 3c) branch off from of the axial conduit (2). The channels (3a, 3b, 3c) have respective inlets (30a, 30b, 30c) on the axial conduit (2) and respective outlets (31a, 31b, 31c) on the second portion (6). The channels (3a, 3b, 3c) act as dispensing nozzles for dispensing steam. The inlets (30a, 30b, 30c) of the channels are at the same height and they spaced apart of 120° each other on a circumference of the cylindrical conduit. The outlets (31a, 31b, 31c) of the channels are at the same height and they are spaced apart of 120° each other on a circumference of the eternal lateral wall of the second portion (6).

The channels (3a, 3b, 3c) have axes intersecting the periphery of the cylindrical duct (2). With references to FIG. 3, the axes of the channel have projections (a, b, c) on a plane orthogonal to the axis of the axial conduit (2). Said projections (a, b, c) intersect each others in three points (A, B, C) forming an equilateral triangle having center (O) coincident with the axis of the axial conduit (2). Therefore the projections (a, b, c) are tangent to a circumference (T) inscribed into the equilateral triangle (A, B, C). Said circumference (T) has centre (O) coincident with the axes of the axial conduit and radius minor than the radius of the cylindrical conduit.

The inlets (3a, 30b, 30c) of the channels are in correspondence of the first section (1) above the greater base of the first section.

Therefore, the channels (3a, 3b, 3c) have a sloping direction, from the inside towards the outside, with respect to a plane orthogonal to the axis of the axial conduit (2). Preferably each channel (3a, 3b, 3c) is sloped of an angle between 20°-70° with respect to a plane orthogonal to the axis of the axis of the axial conduit (2).

Figure 4:
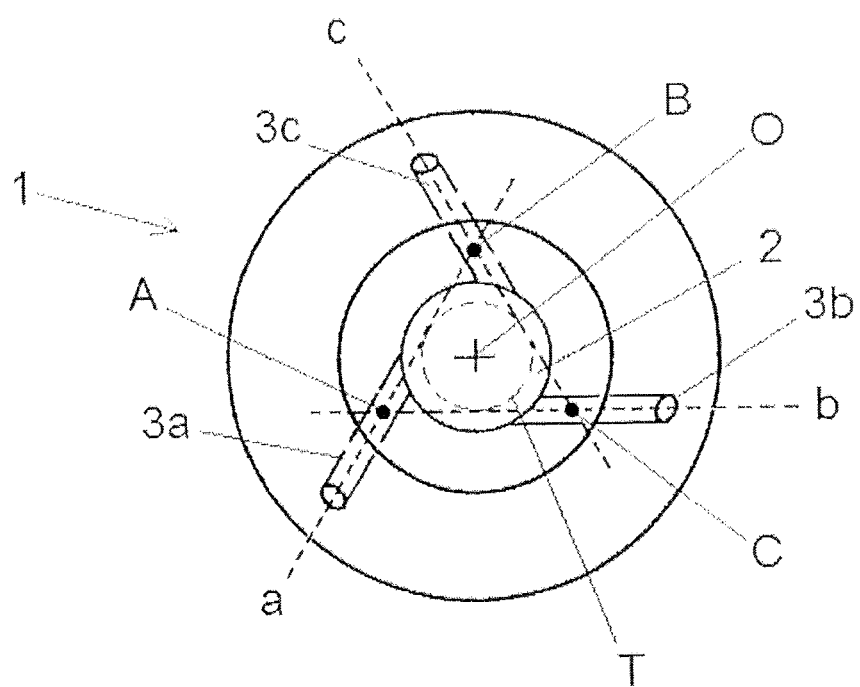
Figure 5:
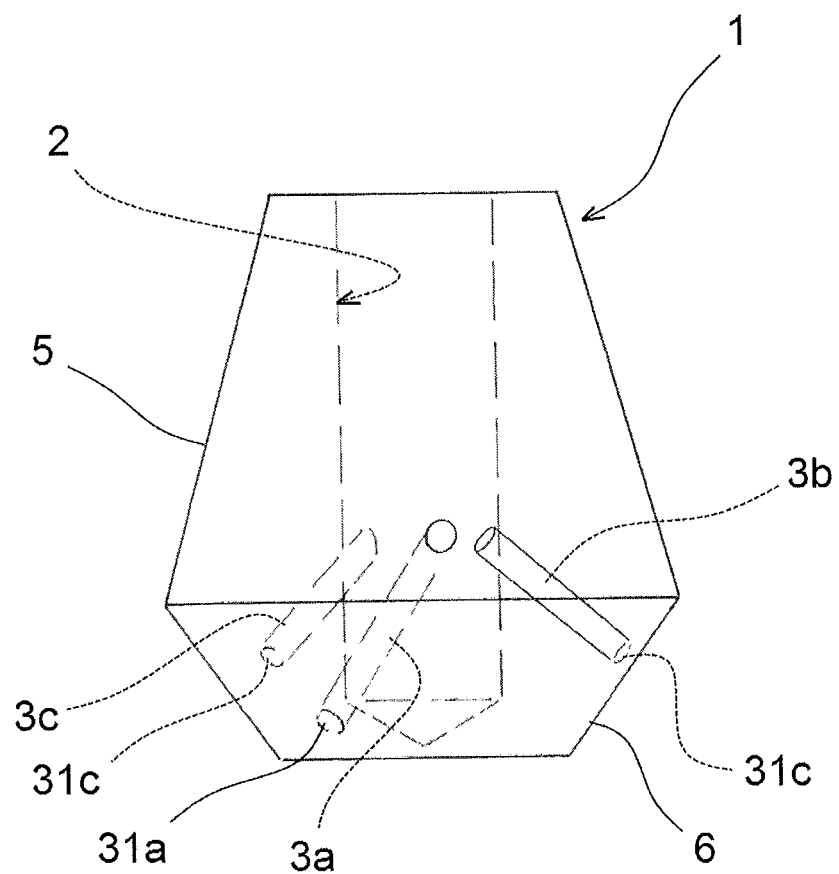
FIG. 5 is a side view of the dispensing head showing the outlets of the channels at different heights.
Figure 6A:
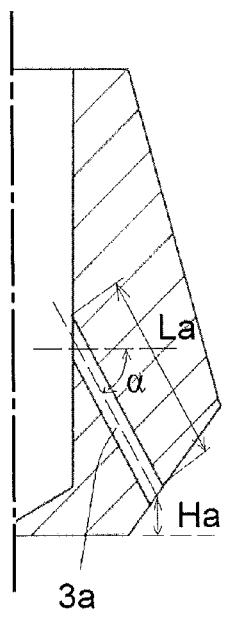
FIGS. 6A, 6B, and 6C are sectional views taken along the axis of the channels, respectively.
Figure 6B:
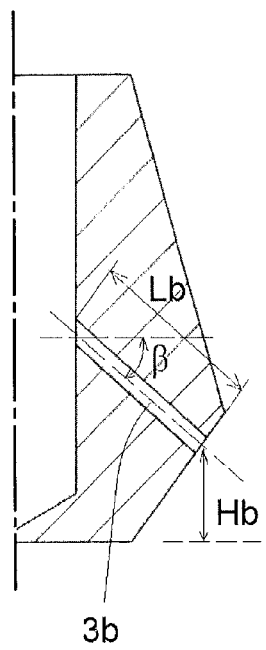
Figure 6C:
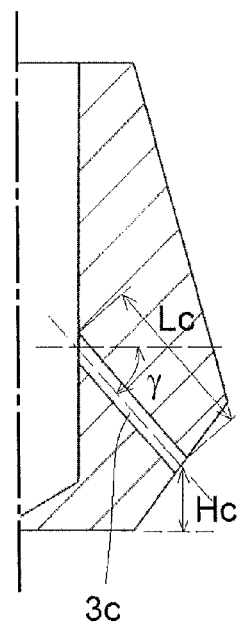

Although in the FIGS. 2-4 the outputs (31a, 31b, 31c) of the channels are disposed at the same height, they can have different heights while still falling within the scope of the present invention. FIGS. 5 and 6A-C show the outlets (31a, 31b, 31c) of the channels at different heights (Ha, Hb, Hc) with respect to a bottom wall of the head. The axes of the channels (3a, 3b, 3c) have different inclination angles with respect to a plane orthogonal to the axis of the axial conduit.

After describing the structure of the dispensing head (1) provided in the steam wand of the present invention, the description continues illustrating the operation of the steam wand.

The coffee machine (7) comprises the internal boiler (70) generating pressurized steam which flows towards the steam wand (8) until the steam reaches the axial conduit (2) provided in the dispensing head (1) and flows out through the three channels (3a, 3b, 3c) acting as dispensing nozzles.

In order to froth milk, the dispensing head (1) of the steam wand is immersed in the mass of the milk contained in a traditional jug (9).

Because of the special configuration of the three channels (3a, 3b, 3c), the hot steam jets, delivered by the channels, generate a whirl inside the mass of the milk, which is powerful and perfectly able to ensure the necessary circular acceleration to the mass, without forcing the operator to tilt the milk jug, unlike the prior art.

Finally, it must be noted that the present inventive idea can be advantageously implemented also by giving a different shape (perhaps oval, spherical, cylindrical, etc.) to the dispensing head (1) with respect to the one shown in the enclosed figures.

Likewise, the dispensing head (1) may have a different number of nozzles (or one nozzle only) with respect to the version with three nozzles that is shown in the figures.

I claim:

1. A steam wand apparatus for a coffee machine, the steam wand apparatus comprising:
    a dispensing head having an axial conduit that feeds at least two channels that end outside of said dispensing head, the at least two channels adapted to dispense steam toward a liquid contained in a container, said at least two channels being directed such that projections of axes of the respective channels of said at least two channels are tangent to a circumference having a center on an axis of said axial conduit so as to generate a whirl within the liquid in the container, each channel of said at least two channels having an inlet on said axial conduit, said at least two channels each having a sloping direction from an inside to an outside of said dispensing head with respect to a plane orthogonal to the axis of said axial conduit, the sloping direction having an inclination angle of between 20° and 70°, said dispensing head having a first section and a second section, said second section having an overturned truncated-conical profile, said at least two channels ending outside a second section of said dispensing head, each channel of said at least two channels having an outlet on a lateral wall of said second section, the outlets of said at least two channels being respectively at different heights on said lateral wall of said second section, said at least two channels respectively having different inclinations with respect to a plane orthogonal to the axis of said axial conduit.

2. The stem wand apparatus of claim 1, wherein each channel of said at least two channels has an inlet on said axial conduit, and wherein the outlets of said at least two channels are equally spaced from each other.

3. The stem wand of claim 1, wherein each channel of said at least two channels has an inlet on said axial conduit, and wherein the inlets of said at least two channels are equally spaced from each other.

* * * * *